United States Patent
Nord et al.

(10) Patent No.: US 8,687,814 B2
(45) Date of Patent: Apr. 1, 2014

(54) SECURING ENCRYPTED VIRTUAL HARD DISKS

(75) Inventors: Joseph Harry Nord, Lighthouse Point, FL (US); Timothy Gaylor, Plantation, FL (US); Benjamin Elliot Tucker, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 13/474,936

(22) Filed: May 18, 2012

(65) Prior Publication Data

US 2012/0297206 A1 Nov. 22, 2012

Related U.S. Application Data

(60) Provisional application No. 61/488,615, filed on May 20, 2011.

(51) Int. Cl.
*H04L 9/14* (2006.01)
*H04L 9/08* (2006.01)

(52) U.S. Cl.
USPC .................. 380/286; 380/278; 380/44

(58) Field of Classification Search
None
See application file for complete search history.

(56) References Cited

U.S. PATENT DOCUMENTS 4,238,854 A * 12/1980 Ehrsam et al. ............. 713/165
7,831,833 B2 11/2010 Gaylor

OTHER PUBLICATIONS

Encrypted data plugin-Disk cryptography. Joseph Nord. Citrix Blog. Jul. 15, 2010.*

* cited by examiner

*Primary Examiner* — Venkat Perungavoor
(74) *Attorney, Agent, or Firm* — Banner & Witcoff, Ltd.

(57) ABSTRACT

Securing encrypted virtual hard disks may include a variety of processes. In one example, a virtual hard disk is created for a user and encrypted with a volume key, and the volume key placed in an administrator header. The administrator header may be encrypted with a protection key, the protection key created from a user identifier corresponding to the user, a volume identifier corresponding to the virtual hard disk, and two cryptographic secrets. The protection key may then destroyed after encrypting the administrator header and therefore, might never leave the encryption engine. The two cryptographic secrets may be stored in separate storage locations, one accessible to the user and the other accessible to administrators. Accordingly, the protection key might never transmitted or can be intercepted, and no single entity may be compromised to gain access to all of the information needed to recreate the protection key.

20 Claims, 10 Drawing Sheets

US 8,687,814 B2

SECURING ENCRYPTED VIRTUAL HARD DISKS

CROSS-REFERENCE TO RELATED APPLICATION

This application claims the benefit of priority from U.S. provisional application Ser. No. 61/488,615, entitled "Systems and Methods for Securing Encrypted Virtual Hard Disks," and filed May 20, 2011. The contents of the above noted application is incorporated herein by reference in its entirety.

TECHNICAL FIELD

Aspects of the disclosure relate generally to virtual disks and cryptographic key management. For example, some aspects relate to securing encrypted virtual disks.

BACKGROUND

Many enterprises permit associates to bring their personal laptop or computer to work and use that laptop as their company computer, use personal computers at home while working on corporate information, or allow contractors to use personal computers in their work in lieu of a company machine. In some cases, having an employee or contractor use their personal computer for work-related computing may result in employees and contractors storing sensitive company documents and application information to their generally unsecure personal computers. Memory on a personal laptop is typically unmanaged and it may be difficult to enforce security policies when a user is not logged into a company network. Furthermore, in some examples, laptop computers may be more easily stolen or hacked than corporate computers protected by security policies and firewalls.

One solution to this problem includes providing users with encrypted virtual hard disks that may be mounted as if they were physical disks. The user may use a password, known only to them, that allows them to decrypt the disk and mount it for use. Corporate data may be stored to the encrypted volume, preventing access by malicious third parties. While this adds security, there may still exist some risks. For example, the corporate enterprise, who may actually own the data, may be unable to access the encrypted disk without the user's password. This may be particularly relevant where the encrypted virtual hard disk is stored on a cloud service, such as the DROPBOX web-based file hosting service operated by DROPBOX, INC. of San Francisco, Calif., or in other instances where the enterprise may want to recover data without requiring the user or contractor's cooperation. Second, if the user forgets their password, an administrator may not be able to recover the encrypted data. While the enterprise may store user passwords in a central database, allowing them to decrypt the image in case the user forgets their password, this requires transmission of passwords over a network where they may be intercepted, thereby significantly compromising security.

Thus, systems and methods are needed to secure encrypted virtual hard disks and centrally manage encryption keys.

BRIEF SUMMARY

Described are example embodiments, features and other aspects of methods and systems for securing encrypted virtual hard disks. In one embodiment, a virtual hard disk is created for a user and encrypted with a volume key, and the volume key placed in an administrator header. The administrator header is encrypted with a protection key, the protection key created from a user identifier corresponding to the user, a volume identifier corresponding to the virtual hard disk, and two cryptographic secrets. The protection key is destroyed after encrypting the administrator header and never leaves the encryption engine. The two cryptographic secrets are stored in separate storage locations, one accessible to the user and the other accessible to administrators. To unlock the virtual hard disk, in these example embodiments, the cryptographic secrets are retrieved, and, using the volume identifier stored in a cleartext header of the virtual hard disk and the user identifier, the protection key is recreated. The administrator header can then be decrypted and the volume key retrieved, allowing decryption of the virtual hard disk. Accordingly, the protection key is never transmitted and therefore cannot be intercepted. Moreover, no single entity can be compromised to gain access to all of the information needed to recreate the protection key.

Details of various example embodiments, aspects and features of the disclosure are set forth in the accompanying drawings and the description below.

BRIEF DESCRIPTION OF THE FIGURES

The foregoing and other objects, aspects, features, and advantages will become more apparent and better understood by referring to the following description taken in conjunction with the accompanying drawings, in which.

Figure 1A:
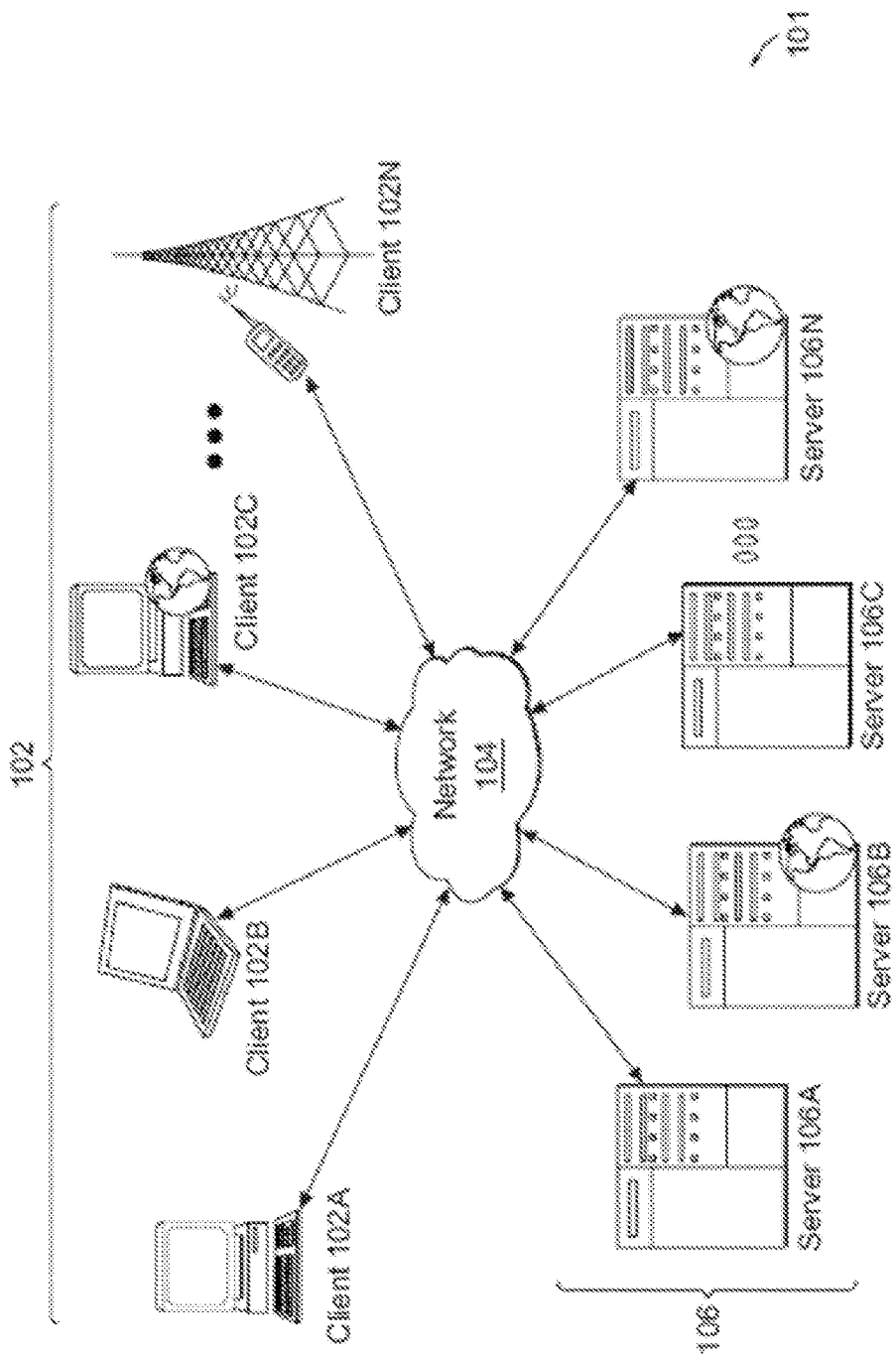
FIG. 1A is a block diagram illustrative of an embodiment of a remote-access, networked environment with a client machine that communicates with a server.

The features and advantages of aspects of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In enterprises or companies with remote or traveling users with mobile or personal computing devices, it may be desirable to segregate or partition corporate data from personal data of the users on said computing devices for security purposes. Users may create local volumes, folders, or virtual hard disks for the corporate data and encrypt these volumes, folders or virtual hard disks using software on the user's computing device. This allows every user to have independent encryption keys. Such an encryption method and system may be useful, for example, if a first user's computing device is compromised. In such an instance, the encryption key cannot be used for accessing a second user's encrypted information on the second user's computing device. However, local creation requires the user to have encryption software installed and licensed, which may not be available, particularly on smart phones or other mobile devices. Similarly, local creation may be processor intensive, taxing the resources of these devices. Additionally, local creation results in encrypted volumes that are inaccessible to administrators, if the user forgets the password or loses the key. Administrators can avoid these issues by creating and encrypting a virtual hard disk on a central server, providing it to each user that requests the disk. However, this results in every user having a disk encrypted with the same key, increasing the possibility of multiple users being compromised in the same attack.

Accordingly, in some embodiments of the methods and systems described herein, a centralized service may create and encrypt virtual disks, sometimes referred to as virtual hard disks or disk images, for use by client computers, with individualized encryption keys for each user. The client computers can mount these encrypted virtual disks as if they were physical hard disks for isolated and encrypted local storage. The virtual disks may be customized during creation by default size, encryption passwords, encryption keys, and storage types. In some embodiments, the encrypted virtual disk may be delivered to the client via an encrypted network protocol, such as SSL, preventing interception or man-in-the-middle attacks.

Because each virtual disk has its own encryption key, it may be desirable to centrally manage these keys to allow administrator access and control, as well as providing a mechanism for a user to unlock the volume in case of a forgotten password. However, many existing solutions require the administrator and user to have shared knowledge of the same key. This reduces security, as well as requiring administrator maintenance of a user-specific key database.

Some existing solutions assume that the user's machine is a corporate asset and is a member of a corporate domain, and utilize domain management properties and policies. These solutions thus require the user's machine to be a member in the domain. For example, BITLOCKER by MICROSOFT CORP. of Redmond, Wash. stores volume key information for encrypted disk volumes in an Active Directory space associated with the user. Since Domain Administrators are "trusted," any domain administrator can access the volume key for any encrypted volume to which the administrator wants access. However, many enterprises do not want the domain administrator to have access to all encrypted disk volumes in the system.

Another solution is PGPDISK, manufactured by SYMANTEC CORPORATION of Mountain View, Calif. PGPDISK allows the inclusion of multiple headers in an encrypted virtual disk, each header storing the encryption key or volume key for the disk. One header may be unlocked by a user passphrase, and another header may be unlocked by an administrator passphrase. Either users or administrators may unlock the protected volume by entering a string when prompted for an unlock password. The encryption system loops through each header, trying the given string, until it either successfully unlocks access to the volume key or runs out of headers, in which case the password is considered incorrect and a reentry may be prompted. However, this requires a centralized database of administrator passphrases, and also may require transmission of the passphrase over a network for remote access to the volume, where it may be compromised or otherwise intercepted.

Accordingly, aspects discussed herein provide for generation of an intermediate protection key that provides access to protected information by administrators and users who have forgotten their password, while both never leaving the client execution system and never being stored at the central system. Additionally, key entropy is spread across two or more separate systems, minimizing the opportunity for a single point of attack on a central key storage server.

Prior to discussing specifics of creating, delivering, and maintaining encrypted virtual hard disks, the following description provides an overview of an exemplary computing environment that may be used in conjunction with various aspects. FIG. 1A illustrates an example embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 may include an appliance installed between the server(s) 106 and client machine(s) 102. This appliance may mange client/server connections, and in some cases may load balance client connections amongst a plurality of backend servers.

The client machine(s) 102 may, in some examples, be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 may, in some example, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XENSOLUTIONS, CITRIX SYSTEMS, IBM, VMWARE, or any other hypervisor. In other embodiments, the virtual machine 102C may be managed by any hypervisor, while in still other embodiments, the virtual machine 102C can may managed by a hypervisor executing on a server 106 or a hypervisor executing on a client 102.

The client machine 102 can in some embodiments execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments may include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted). Applications may be remoted in multiple ways. In one example, applications may be remoted in a seamless manner in which windows are created on the client device so as to make the application display seem as if it were running locally on the client device and the desktop thereof. In another example, a remoted application may be provided in a windowed mode where a desktop is remoted to the client device and the application is displayed as an application executing in the remoted desktop. Various other remoting methods and techniques may also be implemented or used.

The server 106, in some embodiments, may execute a remote presentation client or other client or program that uses a thin-client or remote-display protocol to capture display output generated by an application executing on a server 106 and to transmit the application display output to a remote client 102. The thin-client or remote-display protocol can be any one of the following protocols: the Independent Computing Architecture (ICA) protocol manufactured by CITRIX SYSTEMS, Inc. of Ft. Lauderdale, Fla.; or the Remote Desktop Protocol (RDP) manufactured by the MICROSOFT Corporation of Redmond, Wash.

The computing environment 101 may include more than one server 106A-106N such that the servers 106A-106N are logically grouped together into a server farm 106. The server farm 106 may include servers 106 that are geographically dispersed and logically grouped together in a server farm 106, or servers 106 that are located proximate to each other and logically grouped together in a server farm 106. Geographically dispersed servers 106A-106N within a server farm 106 may, in some examples, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some examples, a server farm 106 may include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 may include a first group of servers 106 that execute a first type of operating system platform, and a second group of servers 106 that execute a second type of operating system platform. The server farm 106, in other embodiments, may include servers 106 that execute different types of operating system platforms.

The server 106, in some examples, may be any server type. For instance, the server 106 may be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 may be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A may acquire an enumeration of applications available to the client machine 102 and well as address information associated with an application server 106 hosting an application identified within the enumeration of applications. The first server 106A may then present a response to the client's request using a web interface, and communicate directly with the client 102 to provide the client 102 with access to an identified application.

The server 106 may, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER or XENAPP; MICROSOFT WINDOWS Terminal Services manufactured by the Microsoft Corporation; or an ICA client, developed by Citrix Systems, Inc. Other examples or embodiments may include a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments or examples may include a server 106 that executes any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 may, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
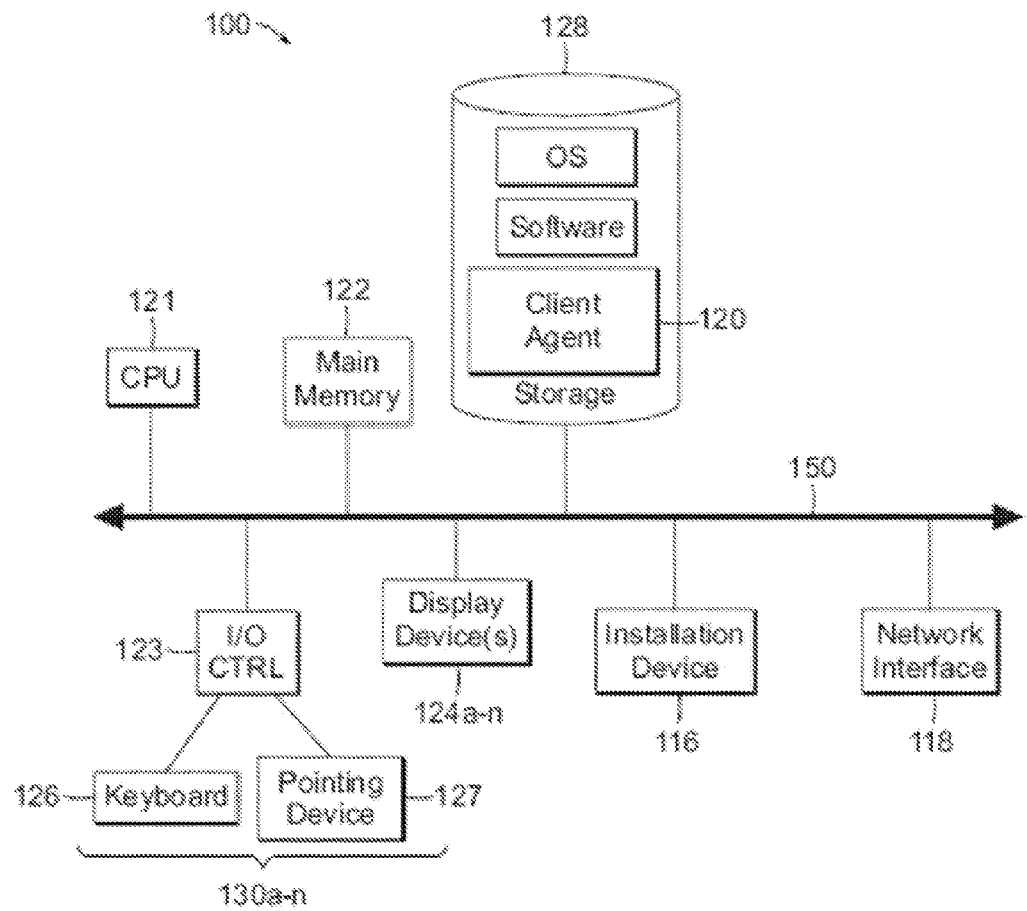
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
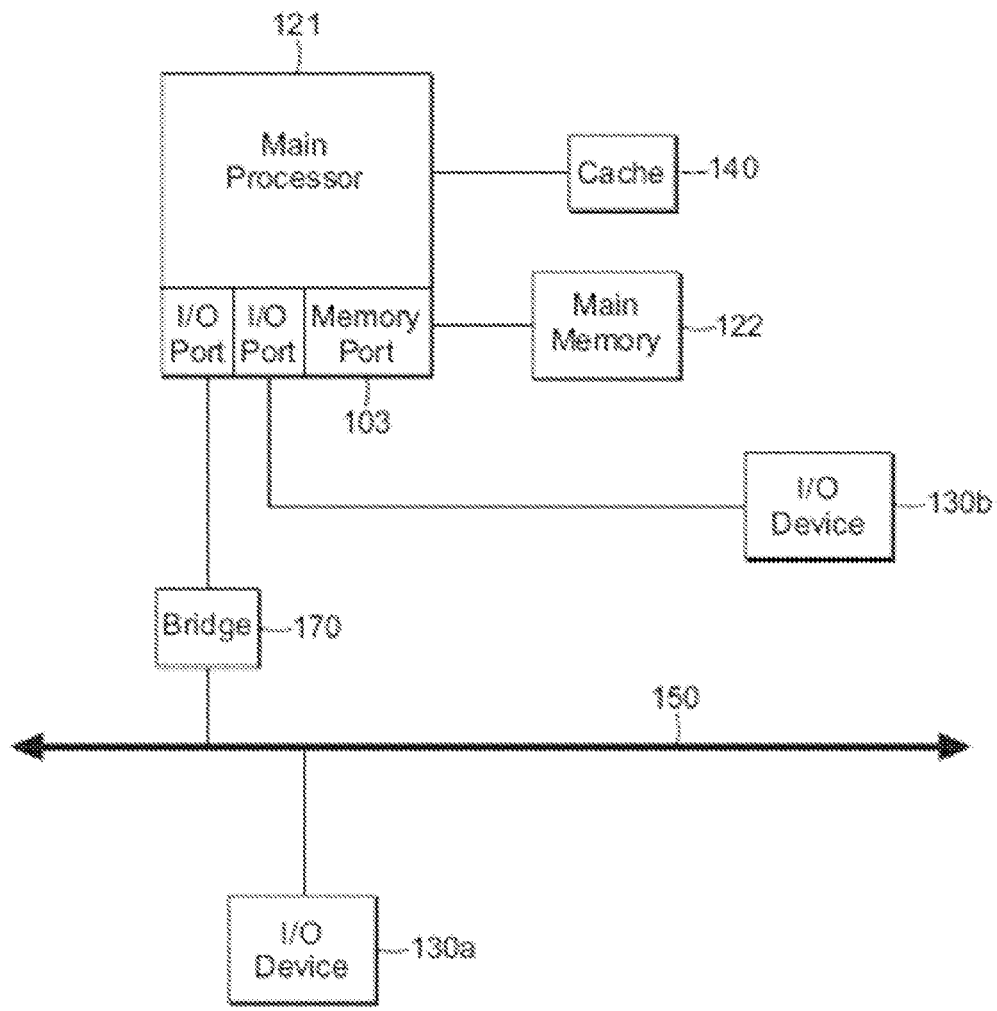

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 may be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 may be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device. In yet still other embodiments, the computing device 100 may a smart phone or tablet computer, including products such as the iPhone or iPad manufactured by Apple, Inc. of Cupertino, Calif.; the BlackBerry devices manufactured by Research in Motion, Ltd. of Waterloo, Ontario, Canada; Windows Mobile devices manufactured by Microsoft Corp., of Redmond, Wash.; the Xoom manufactured by Motorola, Inc. of Libertyville, Ill.; devices capable of running the Android platform provided by Google, Inc. of Mountain View, Calif.; or any other type and form of portable computing device.

Aspects, features and embodiments described herein may make use of various encryption schemes and standards. Throughout this specification, reference is made to a "hash function," "hash," or "hashing". These terms are in reference to any procedure or mathematical function that receives data as an input and provides a given output in response to said input. Said output may be referred to as a hash value, or may be referred to as a message digest. The output of a hash may be a single datum or integer. The output of a hash may be a fixed-size bit string. A hash function may rely one or more keys to accomplish said hashing. Examples of hash functions known in the art include MD2 (Message-Digest algorithm), MD4, MD5, SHA-0 (Secure Hash Algorithm), SHA-1, SHA-2, GOST, HAVAL, PANAMA, RadioGatun, RIPEMD, Tiger, and WHIRLPOOL.

Throughout this disclosure, reference is made to a "public key," "public keys," and "public key encryption." These terms broadly reference to any methods for transforming data into a form that can only be interpreted by the intended recipient, recipients, or otherwise intended audience. Public key encryption methods may involve the use of asymmetric key algorithms, where a key necessary to encrypt data is different from the key needed to decrypt the data. This allows the key with which to encrypt said data, the "Public Key" to be shared widely. Integrity of security is maintained because the separate key with which to decrypt the encrypted information remains secret. The secret key may also be referred to as a private key, and the combination of a public key and corresponding private key may be referred to as a public-private key pair. Thus, public key encryption does not require a secure initial exchange of one or more secret keys. Examples of asymmetric key implementations include DSS, RSA Encryption Algorithm, PGP, Internet Key Exchange, ZRTP, SSH, SSL, TLS, and SILC.

It is understood that throughout this disclosure, where public keys or public key encryption is used or disclosed, one may alternatively or additionally use any other form of encryption to successfully implement the systems and methods disclosed herein, including private key encryption or any other form of encryption.

Throughout this disclosure, reference is made to encryption. Encryption may broadly refer to any one or more of various means, methods, systems, functions, etc. for transforming data from an interpreted form and securing it by a process that renders the data uninterpretable to anyone but those that are able to decrypt the encrypted data. Encryption may refer to a wide variety of encryption standards and techniques, including private key and public key encryption. Encryption and decryption may be accomplished via a system implementing passwords, keys, or a combination of both. Encryption schemes may include symmetric-key encryption schemes where secret keys are exchanged between the party seeking to encrypt data and the party seeking to decrypt data. Such schemes may also be referred to as "shared secret" or "pre-shared" encryption schemes. Examples of such encryption schemes may include the Advanced Encryption Standard, Blowfish, Twofish, Serpent, CASTS, RC4, 3DES and IDEA.

It is understood that throughout this disclosure, where symmetric-key, shared secret encryption, or any other form of encryption is used or disclosed, one could also alternatively use any other form of encryption to successfully implement the systems and methods disclosed herein, including public key encryption or any other form of encryption.

Throughout this disclosure, reference may be made to a "shared key" or "sharing keys" for the purposes of encryption or decryption. Shared keys may broadly refer to keys which may be shared between a particular group of users. A shared key may be any type or form of key used in any type or form of encryption scheme or standard. In some examples, a shared key may be unique to a particular file or may be shared with only a single user, application, or process. Additionally or alternatively, a shared key may be an asymmetric private/public key pair.

Figure 2A:
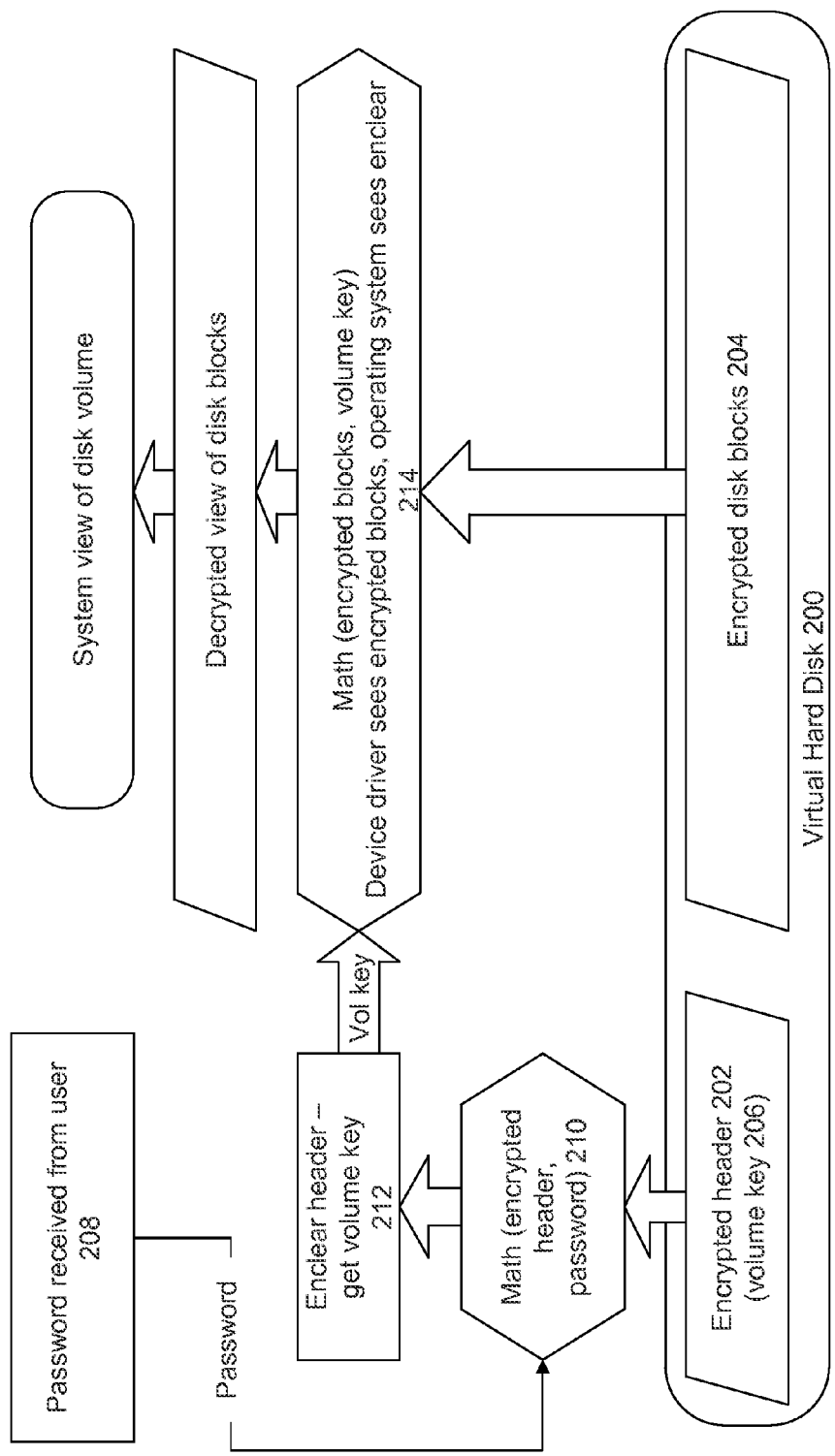
FIG. 2A is a block diagram illustrative of an embodiment of decrypting and mounting an encrypted virtual hard disk.

Referring now to FIG. 2A, illustrated is an embodiment of decrypting and mounting an encrypted virtual hard disk 200 including a single encrypted header 202 and a payload of encrypted disk blocks 204. The encrypted disk blocks 204 may be encrypted with a volume key 206 stored within the encrypted header 202. Thus, to decrypt disk blocks 204, the system must first decrypt header 202 to obtain access to the volume key. For example, a password 208 may be received from a user. The password may comprise a pass phrase, a password, a string, or any other type and form of data. In some examples, password 208 may comprise a stored decryption key received from an agent upon authentication, such as the user logging in, using a biometric scanner, providing a key value, or any other type and form of authentication. Password 208 may comprise a decryption key for encrypted header 202, such that a mathematical function 210 applied to the encrypted header 202 and password 208 may result in a decrypted or enclear header. Mathematical function 210 may comprise any type and form of decryption function applicable to the encryption scheme used, as discussed above.

When the header 202 is decrypted through use of password 208, the volume key 206 may be recovered at 212. The volume key may comprise a phrase, password, string, or any other type and form of data used as a decryption key for the encrypted disk blocks 204 of the virtual hard disk 200. A second mathematical function 214 may be applied to the encrypted disk blocks 204 and volume key 206 to present a decrypted view of the disk to the operating system, file system, or applications. The volume key is used both during encryption and decryption of the virtual hard disk, but is never shared outside of the encryption system.

Although only one header 202 is shown, in some embodiments, multiple headers may be included, each with its own password or passphrase, and each containing the volume key. As discussed above, this allows for a separate administrator header. However, in such examples, the passphrase of the administrator must still be stored someplace, providing a single point of failure or security breach.

Figure 2B:
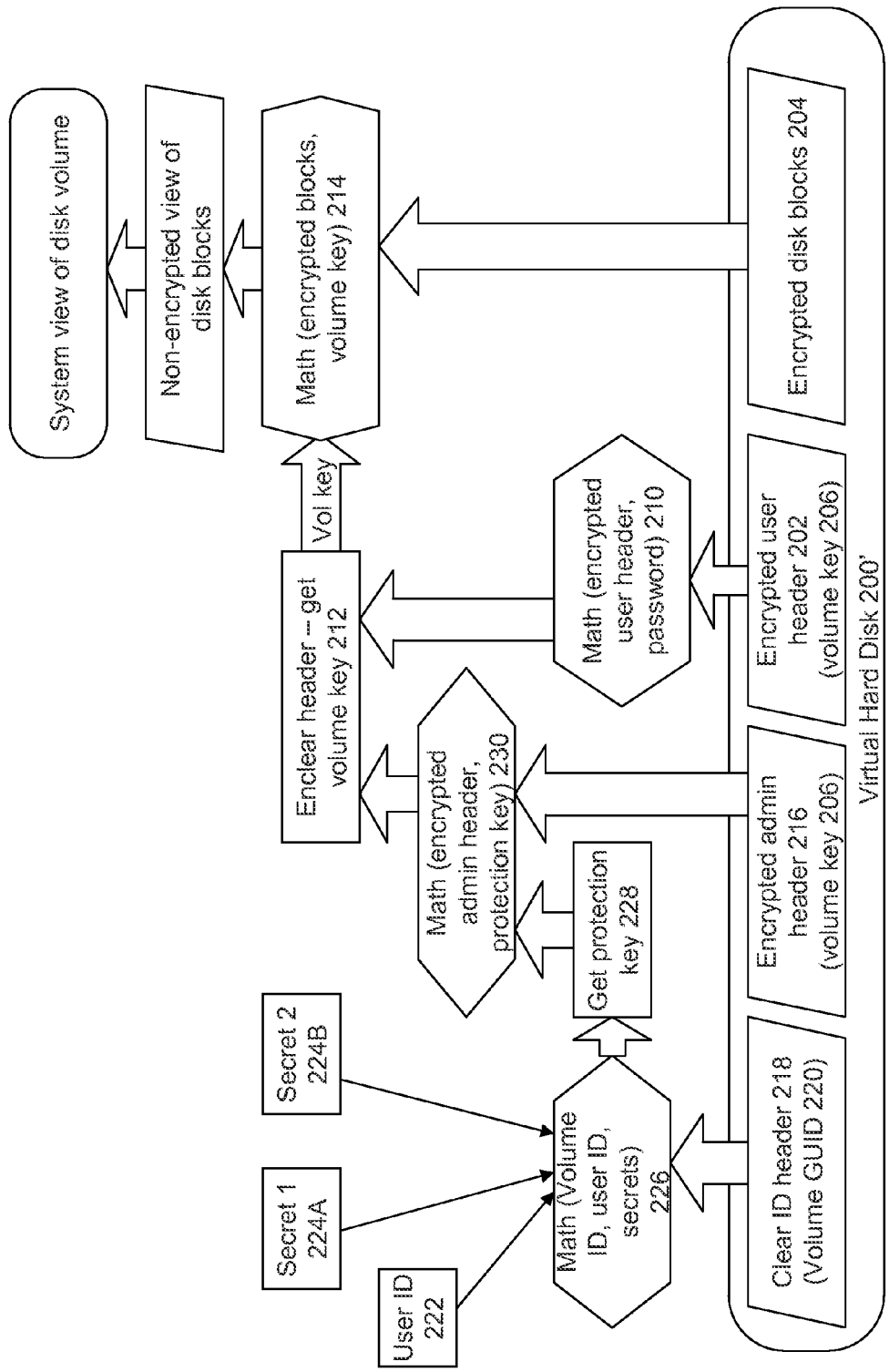
FIG. 2B is a block diagram illustrative of an embodiment of decrypting and mounting an encrypted virtual hard disk with a centrally managed cryptographic key.

Referring now to FIG. 2B, illustrated is an embodiment of decrypting and mounting an encrypted virtual hard disk 200' including a plurality of encrypted headers 202 and 216, and a payload of encrypted disk blocks 204. Encrypted user header 202 includes volume key 206 and is decrypted in the same method as discussed above in connection with FIG. 2A. However, virtual hard disk 200' further includes an encrypted admin header 216, which also includes volume key 206. Admin header 216's decryption key is not stored, either on the local system or a centralized server. Rather, the decryption key, referred to below as a protection key, is generated on the fly when access is requested. This eliminates the possibility of interception of the decryption key if the virtual hard disk is accessed remotely. Although referred to as a user header 202 and administrator or admin header 216, each of headers 202 and 216 may be used by users, administrators, agents, or other entities. Accordingly, user header 202 may broadly refer to a typical header encrypted by a single password, phrase, key, data string, or other value with or without added cryptographic salt, while admin header 216 may be interpreted as a header encrypted with protection keys generated from cryptographic secrets stored in separate locations as discussed herein.

In some examples, a non-encrypted header 218 of the virtual hard disk 200' includes a volume GUID 220. The volume GUID 220 may comprise any globally-unique identifier of the virtual hard disk 200' and may be generated during creation of the virtual hard disk. GUID 220 may be stored within a data string, field, or tag as part of the header 218 of the virtual hard disk 200'. Although referred to here as non-encrypted for the purpose of the present disclosure, in some examples, header 218 may be further encrypted by additional systems. For example, virtual hard disk 200' may be stored within another disk, which may be encrypted by a whole-disk encryption system. Thus, header 218 may be further encrypted. Accordingly, in some examples, header 218 may be considered non-encrypted or clear if it is readable by a decryption system or engine decrypting virtual hard disk 200'. In some embodiments, non-encrypted header 218 may include a data string of cryptographic salt (not illustrated). The salt may be required by various encryption schemes, and may be used to pad inputs to an encryption cipher, provide additional randomization, or for other similar purposes.

The virtual hard disk 200' may be created for a specific user or responsive to a user request in some instances. The user may be identified by a user ID 220, which may comprise a user-specific identifier or string. In many embodiments, user ID 220 may comprise a user name, user workgroup, or other similar identifier or combination of identifiers.

When virtual hard disk 200' is created, two cryptographic secrets, secret 1 224A and secret 2 224B (e.g., cryptographic secrets 224 or secrets 224, and/or a first cryptographic secret and a second cryptographic secret) may also be created. As discussed in more detail below, secret 1 224A may be stored in a first storage location, such as a user's network storage space or on the user's computer's hard drive. Secret 2 224B may be stored in a second storage location, such as a server 106, administrative database, authentication server, or other location, separate from secret 1 224A. In one example, cryptographic secrets 224 may comprise 1024 bits of cryptographically random data.

A mathematical function 228 may be applied to the GUID 220, user ID 222, secret 1 224A, secret 2 224B, and, in embodiments utilizing a salt, salt stored in header 218. The mathematical function may comprise one or more functions of any type and form to deterministically calculate a protection key, including concatenation, hash functions, or other deterministic functions. The protection key may be retrieved at 230, and, as discussed above, may include or otherwise correspond to a decryption key for the encrypted admin header 216. A second mathematical function 232 may be applied to the protection key and encrypted admin header 216, similar to mathematical function 210, to decrypt the header and retrieve the volume key 212.

Accordingly, the protection key may be generated on the fly, locally at the machine accessing the virtual hard disk 200', without requiring the protection key to be transmitted over the network. Additionally, although one or both cryptographic secrets 224 may be retrieved over the network, access to one secret does not break or otherwise compromise the encryption of the admin header 216 or virtual hard disk 200' (e.g., in contrast to systems in which an administrator password is stored centrally).

Figure 2C:
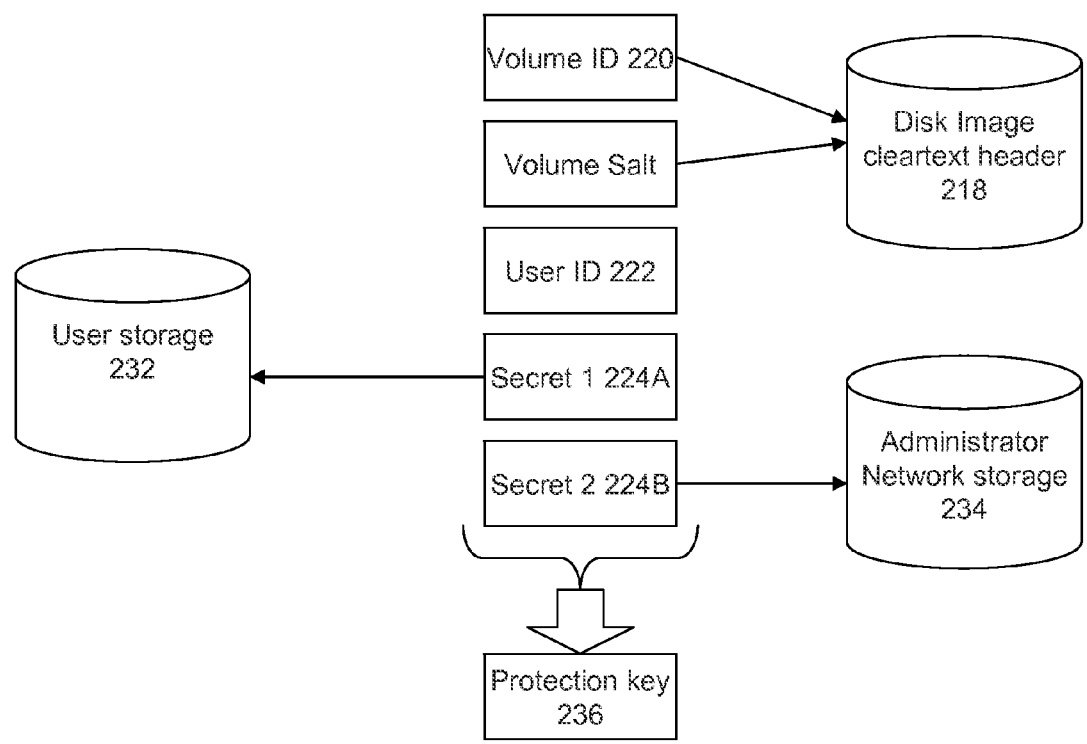
FIG. 2C is a block diagram of a centrally managed cryptographic key.

Referring briefly to FIG. 2C, illustrated is a block diagram of a centrally managed cryptographic key. As discussed above, a unique volume identifier 220, and, in some embodiments, cryptographic salt, may be stored in a cleartext header 218 of the encrypted virtual hard disk. The user ID 222 may comprise a unique identifier of the user for which the disk was created. Secret 1 224A may be stored in a first storage location, such as a user network location 232, and secret 2 224B may be stored in a second storage location (e.g., different from the first storage location), such as an administrator network storage location 234. The volume ID, salt (if applicable), user ID, and secrets may be used as inputs to a mathematical function to create a protection key 236, which may be used to encrypt a header of a virtual hard disk file. The protection key 236 may then be destroyed or deleted. In a particular example, the protection key 236 may be deleted or destroyed without allowing any transmission (e.g., a network transmission and/or other types of transmissions) of the protection key 236.

Figure 2D:
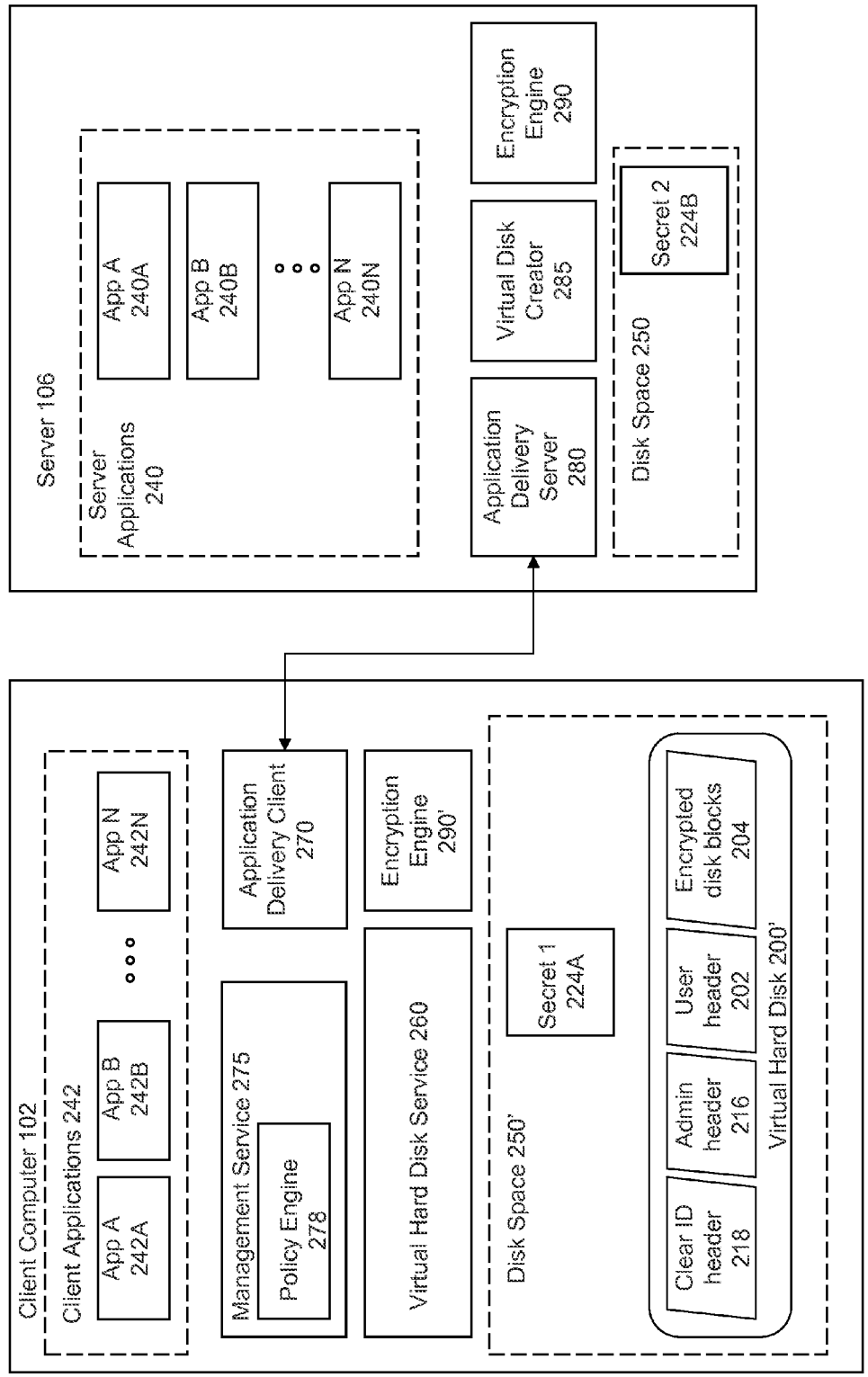
FIG. 2D is a block diagram illustrative of an embodiment of a system for creating and managing encrypted virtual disks.

Illustrated in FIG. 2D is a block diagram of an embodiment of a system for creating and managing encrypted virtual disks. In some embodiments, the system can include a client computer 102 and a server 106 that communicate via a network 104. The client can include a disk space 250' that may include secret 1 224A and a virtual hard disk 200'. In some embodiments, secret 1 224A may be stored external to client computer 102 or a disk space 250' of client computer 102, such as on a user network drive (not illustrated) stored on a server. Executing on the client can be a virtual hard disk service 260, an application delivery client 270 and a management service 275. The server can execute one or more applications 240A-240N (generally referred to as server applications 242 or applications 240), and can also execute an application delivery server 280. The client can execute one or more applications 242A-242N (generally referred to as client applications 242 or applications 240), which may be locally installed applications, or applications installed in storage attached to client computer 102. In some embodiments, a virtual disk creator 285 can execute on the server 106 to intercept client requests and create virtual disks.

Further referring to FIG. 2, and in more detail, in one embodiment the system may include a client computer 102 and a server 106. The client computer 102 may be any computing device 100 described herein and may be any client 102 described herein. Similarly, the server 106 may be any computing device 100 described herein and may be any server 106 described herein. In some embodiments, the server 106 can be a server farm that includes one or more servers 106. The client 102 and the server 106 may communicate over a network 104 such as any network 104 described herein.

In some embodiments, client 102 may execute one or more applications 242A-242N (generally applications 242). In other embodiments, server 106 may execute one or more applications 240A-240N (generally, applications 240), which may be delivered to the client via application delivery client 270 and application delivery server 280. In some embodiments the application delivery client 270 executing on the client 102 may be an application, client or program that may receive application output, such as graphical display output or other data output, from an application delivery server 280 executing on the server 106. The application delivery client 270 of the client 102 may receive application output and display the application output in an application window on the client 102. In some examples, the application delivery client 270 can facilitate the creation of a virtual channel between the client 102 and the server 106, and can facilitate communication between the application delivery system of the client 102 and the application delivery system of the server 106. The application delivery client 270 of the client computer 102 can communicate with the application delivery server 280 of the server 106 and can transmit and receive file access requests. In some example, the application delivery client 270 may be an ICA client manufactured by CITRIX SYSTEMS. In other embodiments, application delivery client 270 may be a remote desktop client, a desktop presentation client, or any similar type of client, and may communicate with server 106 via a presentation layer protocol such as ICA or RDP.

The application delivery server 280 of the server 106 can execute on the server 106 and can interface with applications 240 executing on the server 106. In some embodiments, the server application delivery server 280 may intercept, retrieve or receive graphical application output, e.g. draw commands issued by an application 240, generated by an application 240 and may forward the application output together with any related image data to the application delivery client 270 of the client 102. The application delivery client 270 of the client computer 102 can use the application output and image data to redraw the application as it would be displayed on a display screen of the server 106. In some embodiments, the application delivery server 280 may be an ICA server manufactured by CITRIX SYSTEMS. In some embodiments, the application delivery client 270 of the client 102 may communicate with the application delivery server 280 over one or more virtual channels and one or more transport layer connections.

In still other example, application delivery client 270 and application delivery server 280 may comprise applications for streaming an application 240 from server 106 for execution on client computer 102. In yet still other embodiments, application delivery client 270 and application delivery server 280 may comprise applications, services, agents, or other executable code for downloading an application to client computer 102 for online or offline execution. Accordingly, an application may be executed at server 106 with output transmitted to client 102; may be streamed for execution by client 102; may be downloaded or otherwise transferred to client 102 for local execution; or may be installed on client 102, without departing from the scope of the disclosure.

The applications 240 and 242 (referred to generally as server applications 240 or client applications 242) may be any application. In some examples, the application 240 may include any application described herein, or any other application. In some embodiments, applications 240 executing on server 106 may interface with the application delivery server 280 by transmitting application output to the application delivery client 270. In other embodiments, as discussed above, applications 242 may execute on the client 102 and/or may be streamed to client 102 for execution by client 102.

In some embodiments, the client computer 102 can include disk space 250' that may include a virtual hard disk 200' and a first cryptographic secret 224A. Although illustrated within client computer 102, disk space 250' may include both physical disks included in the client computer 102, external physical disks available to the client computer 102, including dedicated disks and network disks, and virtual disks available to the client computer 102. For example, the first cryptographic secret 224A may be stored in a user-specific network drive or virtual drive. Although referred to as disks, in some embodiments, disk space 250' may comprise flash storage, magnetic storage, optical storage, combinations of any of these, or any other type and form of storage device. Similarly, server 106 may include a disk space 250, or may maintain or communicate with physical, virtual, and/or network disks, and may store a second cryptographic secret 224B. In some embodiments, the second cryptographic secret 224B may be stored in an administrator network drive or virtual drive. Furthermore, although virtual hard disk 200' is illustrated within disk space 250', in some embodiments, the virtual hard disk 200' may be created by server 106 and stored within disk space 250 prior to being transferred to client computer 102.

According to some arrangements, a virtual hard disk service 260 may be executed by the client computer 102. Virtual hard disk service 260 may comprise an application, service, daemon, routine, file system filter driver, or other executable logic for mounting virtual hard disks or disk images, and presenting the virtual hard disk or disk image to an operating system or applications as if it were a physical disk. Virtual hard disk service 260 may interact with the application delivery client 270 or other applications 242 executing on the client to intercept requests to read information from or write information to the virtual hard disk 200' on the client computer 102 and process the request according to the methods and systems described herein. In some embodiments, a virtual hard disk service 260 may also execute on the server, for creation and management of virtual hard disks for transfer to client computers 102.

In some examples, a management service 275 may execute on the client 102 and may interface with the virtual hard disk service 260 and the application delivery client 270. In some embodiments, the management service 275 may comprise an application, server, service, daemon, routine, or other executable code, and may execute in user-mode or kernel-mode. In some embodiments, management service 275 may act as or comprise a policy engine. The management server 275 or a policy engine of the management service may manage the security policies and other management policies that determine which applications should be identified as trusted and which applications should be identified as not trusted. In some embodiments, the management service 275 may execute within the application delivery client 270 as a policy engine of the application delivery client and may be used to determine whether to direct data generated by an application to a virtual hard disk 200'. For example, data generated by trusted applications may be considered corporate data, and may be written to the virtual hard disk, while data generated by non-trusted applications may be written to a user's personal storage. In other embodiments, the management service 275 or a policy engine of the management service 275 may be used to identify an application executing on the client as a trusted or non-trusted application. In some embodiments, a corporate administrator can set policies to mark certain applications as trusted. Additional folders may also be specified as trusted and therefore needing to be enabled for automatic redirection.

In one example, management service 275 or a policy engine may identify an application as a trusted application responsive to a user credential of the user executing the application. For example, in one embodiment, the user may be required to log in prior to executing the application as a trusted application. If the user does not log in, the application may be executed as a non-trusted application. In another embodiment, the application may be executed by a root or administrative user, and may be identified as a trusted application responsive to these user privileges. In yet another embodiment, the application may be provided by a server 106 and be identified as a trusted application by being provided by the server. For example, remotely executed applications or streamed applications, or applications downloaded from a corporate server, may be identified as trusted, while applications installed locally by the user or obtained elsewhere may be identified as non-trusted. Other definitions of trusted and non-trusted might also be used depending on needs or preferences. In some embodiments, an application may be trusted or non-trusted depending on execution parameters of the session. For example, as discussed above, a user may be required to log in to execute the application as a trusted application. Depending on whether the user has logged in or not, the application may be executed either as a trusted application or a non-trusted application. This may be done to avoid requiring multiple instances of identical applications installed.

In some embodiments, a virtual disk creator 285 may execute on the server 106 to intercept client requests to create or deploy virtual hard disks. The virtual disk creator 285 may comprise an application, service, server, daemon, logic, routine, or other executable code for creating, deploying, and managing virtual hard disks. In some embodiments, virtual disk creator 285 may comprise or communicate with an encryption engine 290. In one embodiment, the virtual disk creator 285 can communicate directly with the application delivery client 270 executing on the client 102. The virtual disk creator 285 can, in some embodiments, execute substantially perpetually on the server 106. In other embodiments, the virtual disk creator 285 can wait for client requests to come over a secure network connection (e.g. SSL), where the request can include information on the size of the requested virtual disk, the encryption strength and the encrypted disk size. The virtual disk creator 285 can create the virtual disk using virtual disk creation methods, such as the virtual hard disk (VHD) API. In some embodiments, the virtual disk creator 285 may encrypt the created virtual disk.

In some embodiments, an encryption engine 290' may execute on the client computer 102. Encryption engine 290' may comprise an application, service, server, daemon, routine, or other executable logic for encrypting and decrypting one or more headers of a virtual hard disk 200' and a payload of encrypted disk blocks 204 of the virtual hard disk 200'. In some embodiments, encryption engine 290' may comprise functionality for retrieving cryptographic secrets 224 from one or more storage locations.

Figure 3A:
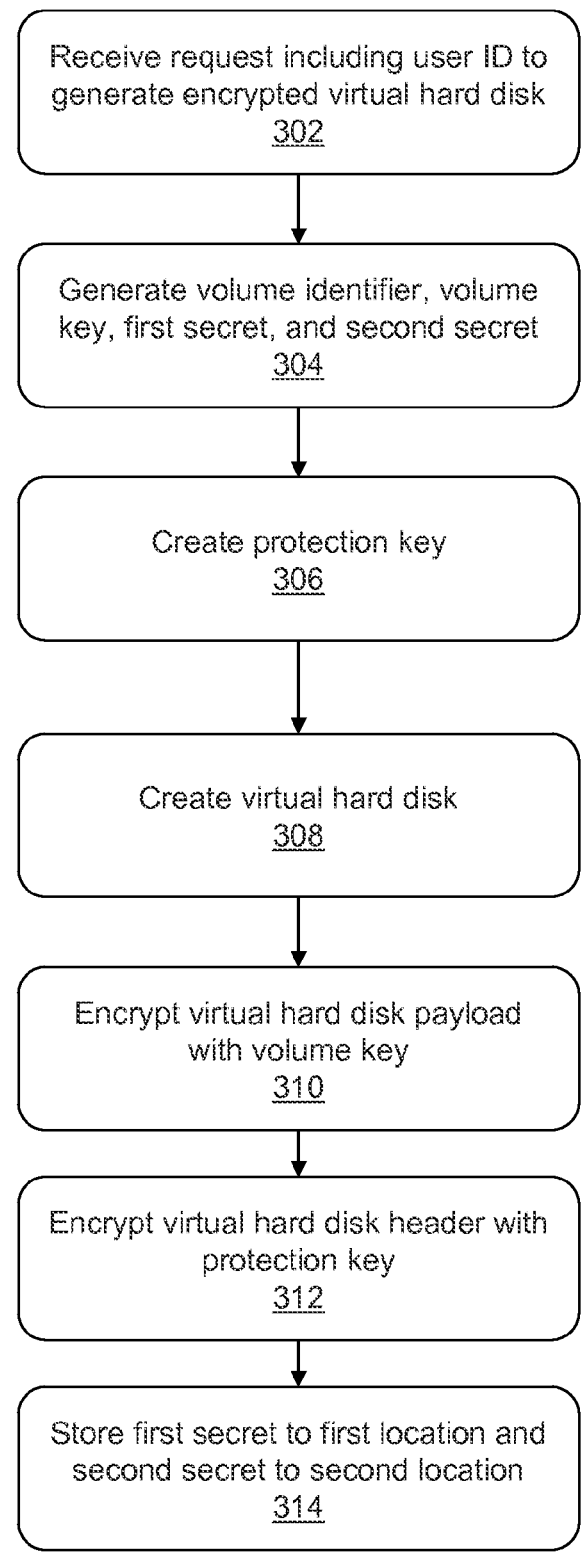
FIG. 3A is a flow diagram illustrative of an embodiment of a method for creating a secure encrypted virtual hard disk.

Referring now to FIG. 3A, illustrated is a flow diagram illustrative of an embodiment of a method for creating a secure encrypted virtual hard disk. At step 302, a server may receive a request to generate an encrypted virtual hard disk, the request including a user identifier of the user for whom the virtual hard disk will be created. In some embodiments, the request may be received by a virtual hard disk creator or virtual hard disk creation engine executed by the server. Additionally or alternatively, the virtual disk creation engine can execute within the context of an application delivery server such that the virtual disk creation engine can intercept any requests issued by a client 102 to the server 106 for an encrypted virtual disk. In other embodiments, the virtual disk creator may receive requests from a management service, a client agent, or another application executing on the client. The client 102, in some embodiments, can issue the request responsive to determining that an application requires a secure storage area. In other embodiments, the client 102 can issue the request responsive to determining that no secure storage area exists on the client 102. The request issued by the client, in some embodiments, can include virtual disk information such as the size of the requested virtual disk, the type of encryption to be used, the strength of the encryption to be applied, encryption passwords to be used, encryption keys to be used, and the type of storage. In other embodiments, the request may comprise user credentials, such as a user name, user password, user identifier, or other information, and/or machine credentials, such as a machine identifier, operating system type and version, management service version or capabilities, MAC address, or any other type and form of information. In some embodiments, the request can be transmitted from the client 102 to the server 106 and can be transmitted over a secure network (e.g. SSL.) In still other embodiments, the client can deliver the request using an encrypted network protocol.

The disk creator, in some embodiments, can respond to receiving the request by queuing the request. In such examples, the disk creator can queue the requests until a later point in time, or until the disk creator has availability to respond to the requests. In still other embodiments, the disk creator can queue the requests and re-issue them to another disk creator executing on a different server.

At step 304, in some embodiments, the server or virtual hard disk creation engine may generate a volume identifier for the virtual hard disk. The server or virtual hard disk creation engine may further create a volume key, a first cryptographic secret, and a second cryptographic secret. In some embodiments, the key and secrets may be generated based on one or more elements of the request. For example, the request may specify a type or size of encryption for the virtual hard disk, and the volume key may be a corresponding size of encryption key. In some embodiments, the server or virtual hard disk creation engine may generate cryptographic salt for use in an encryption function for generating a protection key.

At step 306, an encryption engine executed by the server may create a protection key. The protection key may be created using the user identifier, the volume identifier, the salt (if applicable), and the first and second cryptographic secrets. Various algorithms may be used to create the protection key including concatenation, hashing, XORing, or any other type and form of deterministic algorithm.

At step 308, the server or virtual hard disk creation engine may create the virtual hard disk. The virtual hard disk may be generated using any type and form of virtual hard disk creation system, such as the VHD API provided by Microsoft Corp. In other embodiments, the disk creator 250 can execute virtual disk creation functions that can create the virtual disk. In some embodiments, the server or virtual hard disk creation engine may create the virtual hard disk according to parameters received in the request, such as a specified size or format. For example, if the client request specified a disk size and type of storage, the virtual disk creator can create a virtual disk having that disk size and storage type. In some embodiments, the virtual hard disk may be created at a minimum size or very small size, and may be created as a dynamically-sized disk rather than a fixed-size disk. This may be done to reduce bandwidth requirements to transfer the disk to the client. For example, a very small disk, such as 10 MB, may be generated and encrypted at the server, and may be transferred to the client, where it may be expanded to a much larger size, such as several GB. In a further embodiment, the disk may be expanded over time as a user of the client writes data to the disk. In one embodiment, creating the virtual hard disk may further comprise creating one or more headers including a user header and administrator header (e.g., logically separate headers), each including the volume key. Creating the virtual hard disk may also comprise creating a cleartext or non-encrypted header including the volume identifier, and, in some embodiments, the cryptographic salt used to create the protection key.

At step 310, an encryption engine executed by the server may encrypt the virtual hard disk or payload of the virtual hard disk using the volume key. The encryption engine may use any type and form of encryption method discussed herein, or any similar encryption method. In some embodiments, the encryption engine can encrypt the virtual disk using encryption technologies such as Bitlocker or TruCrypt. In other embodiments, the encryption engine can encrypt the virtual disk using any whole-disk encryption technology. The encryption engine can, in some embodiments, encrypt the virtual disk according to the encryption attributes specified in the client request. In other embodiments, an administrator of the system may set predetermined encryption parameters to be used when encrypting the disk, such as specific encryption and hashing algorithms to be used, including bit length and block sizes, and passwords or key files to be used. In some embodiments, the encryption engine may also encrypt a user header of the virtual hard disk with a user provided or preset password or key. In a further embodiment, the administrator may set a policy allowing the user to change the virtual hard disk user password or user header encryption key.

At step 312, the encryption engine may encrypt an administrator header of the virtual hard disk with the protection key. The administrator header may comprise the volume key, such that decrypting the administrator header allows a decryption engine access to the volume key, with which the payload may be decrypted. After encrypting the virtual hard disk header, the encryption engine may delete or otherwise destroy the protection key. In some embodiments in which the encryption engine generates the protection key and destroys the protection key after encrypting the administrator header, the protection key may never leave the encryption engine (e.g., no transmission or storage to a removable device or the like may be allowed).

At step 314, the server, encryption engine, or virtual hard disk creation engine may store the first cryptographic secret to a first storage location, and the second cryptographic secret to a second storage location. For example, the first storage location may comprise a user network storage drive, specific to the user for whom the virtual hard disk is created. The second storage location may comprise an administrator network storage drive, accessible by administrators of the system. In some embodiments, storing the secrets may comprise establishing a secure communication channel with each storage location or a server maintaining each storage location.

The virtual hard disk, once created and encrypted, may be transferred to a client computing device, network storage of the user, or other storage location for use by the user. In some embodiments, transferring the virtual hard disk may comprise establishing a secure communication channel for transferring the disk. In some examples, the encryption key generation and other encryption processes may be performed by the client computing device or other device.

Figure 3B:
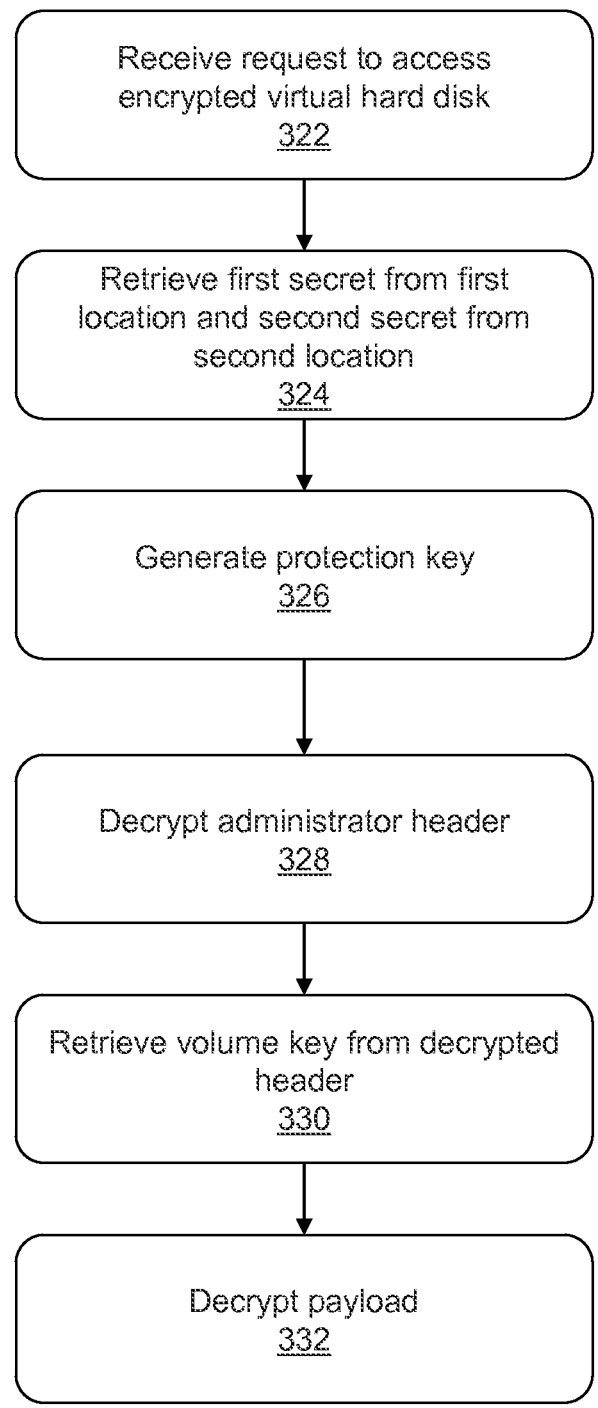
FIG. 3B is a flow diagram illustrative of an embodiment of a method for providing secure access to an encrypted virtual hard disk.

Illustrated in FIG. 3B is a flow diagram illustrative of an embodiment of a method for providing secure access to an encrypted virtual hard disk. At step 322, an encryption engine executed by a computing device may receive a request to access an encrypted virtual hard disk. In some embodiments, the encryption engine may receive the request from an application, operating system, service, or other module executed by the computing device, while in other embodiments, the encryption engine may receive the request from an application or operating system of a remote computing device, such as an administrator server or computer. In some embodiments, the encryption engine may receive the request from a file system filter driver. The encrypted virtual hard disk may comprise a payload of encrypted data blocks encrypted with a volume key, and an administrator header including the volume key encrypted with a protection key. In some embodiments, the virtual hard disk may also include a user header including the volume key, encrypted with a user password. In still other embodiments, the virtual hard disk may also include a cleartext header. The cleartext header may include a volume identifier or GUID, and, in some embodiments, cryptographic salt generated during creation of the protection key as discussed above. In some embodiments, the request may include a volume identifier corresponding to the encrypted virtual hard disk. In other embodiments, the request may include a user identifier of the user for whom the virtual hard disk was created. For example, an administrator attempting to unlock the virtual hard disk may include the user identifier of the user for whom the virtual hard disk was created. In yet other embodiments, the request may include a user identifier of the user for whom the request was created. For example, a request generated by an application may include the user identifier of the user on whose behalf the application is executing, or a user identifier of a currently logged in user.

At step 324, the encryption engine may, responsive to receiving the request, retrieve a first cryptographic secret from a first storage location and a second cryptographic from a second storage location. In some embodiments, the first storage location may comprise a user storage location, such as a local storage volume, user directory on a network storage device, or other user-specific storage. The second storage location may comprise an administrator storage location, such as a storage volume local to an administration server, an administrator directory on a network storage device, or other administrator-specific storage. In some embodiments, the encryption engine may establish a secure connection, such as an SSL connection, to the corresponding storage location to retrieve either cryptographic secret.

At step 326, the encryption engine may generate the protection key, based on the user identifier, volume identifier, first cryptographic secret and second cryptographic secret. Creating the protection key may comprise performing a deterministic algorithm on the user identifier, volume identifier, first cryptographic secret and second cryptographic secret to recreate the protection key that was initially created when the virtual hard disk was created. In some embodiments, the encryption engine may further base the protection key on cryptographic salt in the cleartext header of the virtual hard disk.

At step 328, the encryption engine may decrypt the administrator header using the generated protection key. Decrypting the header may comprise performing any type or form of decryption algorithm using the encrypted header and the protection key. In one embodiment, the encryption engine may attempt to decrypt a plurality of headers of the virtual hard disk using the protection key, iteratively proceeding through the plurality of headers of the virtual hard disk until either running out of headers (at which point, decryption fails, and the encryption engine may report an error) or unlocking or decrypting a header. This may be done in instances where the administrator header may not necessarily be the first header of the plurality of headers. After decrypting the administrator header, in some embodiments, the encryption engine may delete or destroy the protection key (e.g., without any transmission of the protection key). Thus, the protection key never leaves the encryption engine and is not accessible to malicious third parties.

At step 330, the encryption engine may retrieve the volume key from the decrypted administrator header, and at step 332, the encryption engine may decrypt the payload of the virtual hard disk. In some embodiments, the virtual hard disk may be mounted or otherwise provided to an operating system or application such that normal read/write operations or read/write operations via a whole-disk encryption method such as BitLocker or TruCrypt may be performed.

Accordingly, through the systems and methods discussed herein, cryptographic keys may be managed in a form that allows for offline user authentication through user passwords, and administrator access without compromised security through centrally storing administrator keys or utilizing an administrator passphrase. Additionally, the same systems may be used to allow both online user authentication and user reset of passwords without administrator assistance in a lost password scenario, without requiring the user to be a member of a computer domain or Active Directory group. The user may utilize the same mechanisms used by the administrator to unlock the virtual hard disk and recover the volume key. If the user has forgotten his or her password, but is online and can retrieve both cryptographic secrets, the encryption engine may decrypt the administrator header, recover the volume key, and rewrite the user header including the volume key, encrypted with a new user password. This allows for automated password reset without administrator intervention and without transmitting the password over the network.

Furthermore, if the user is online and can retrieve both cryptographic secrets, then in some embodiments, the encryption engine may utilize the methods discussed herein to access the virtual hard disk without requiring the user to enter their user password. This may be done for convenience and efficiency, as well as reducing the number of passwords a user is required to enter when logged into an authentication system.

Figure 4:
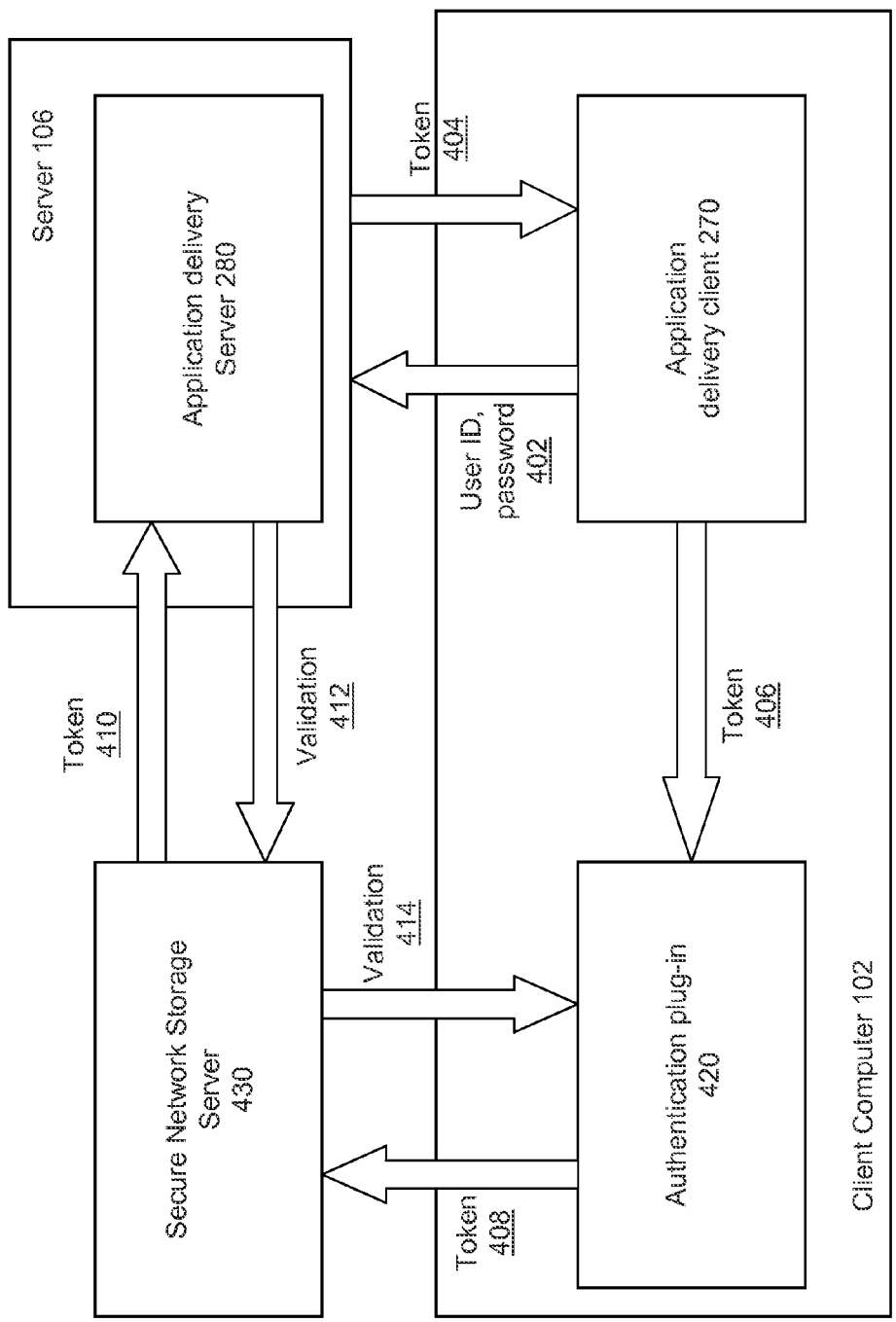
FIG. 4 is a block diagram illustrative of a method of centralized authentication and access to encrypted virtual hard disks.

FIG. 4 is a block diagram illustrative of a method of centralized authentication and access to encrypted virtual hard disks. In brief overview, a client computer 102 may communicate via an authentication plug-in 420 with a secure network storage server 430. In some embodiments, the authentication plug-in 420 may comprise a XenVault plug-in manufactured by Citrix Systems, Inc. The secure network storage server 430 may comprise a XenVault server, also manufactured by Citrix Systems, Inc. Although illustrated as separate, in some embodiments, authentication plug-in 420 may be part of application delivery client 270, and/or secure network storage server 430 may be part of server 106.

At 402, the application delivery client 270 may transmit a user identifier and password to the application delivery server 280. This may be done, for example, when the user logs in. At 404, the application delivery server 280 may respond with a token. The token may be a cryptographic hash, random data, or other data string unique to the user login session. The token may be passed to the authentication plug-in 420 at 406.

At 408, the token may be transmitted to the secure network storage server 430. The secure network storage server may comprise a storage location for one of the cryptographic secrets, discussed above. In some embodiments, transmitting the token to the secure network storage server 430 may comprise establishing a secure communication channel, such as an SSL connection.

The token may be passed to the application delivery server 280 at 410. In some embodiments, the secure network storage server 430 may establish a secure communication channel with the application delivery server. In other embodiments, the secure network storage server and application delivery server 280 may be behind a firewall or other security zone, and may therefore not require additional security between them.

The application delivery server 280 may check the token received from the secure network storage server 430 against a database of currently valid tokens, or in some embodiments, may verify the token by checking a hash of the token against a user identifier transmitted with the token. If the token is valid, then at 412, the application delivery server 280 may return a validation response to secure network storage server 430. At 414, the secure network storage server 430 may return the validation response to the authentication plug-in 420. In some embodiments, the secure network storage server 430 may further provide access to a storage location or other protected resources, responsive to the token verification.

Accordingly, a single sign-on may be used to authenticate the user and receive a token which may be automatically provided to additional servers and verified with the token issuer. Once connected, the encryption engine may retrieve the cryptographic secrets and generate the protection key, providing access to the encrypted virtual hard disk without requiring the user password.

The systems and methods discussed herein may also be used to provide a "kill pill" or disable the user header of an encrypted virtual hard disk, preventing user access without deleting the information stored within the virtual hard disk. For example, if a user's laptop is stolen by a malicious attacker, the attacker may attempt brute force decryption methods or dictionary attacks to decode the user header and recover the volume key. While some systems may provide for destroying the virtual hard disk in response to a predetermined number of failed access attempts, this results in the permanent loss of corporate data within the virtual hard disk that may be valuable, particularly if the laptop is recovered. In one embodiment, the user header of the virtual hard disk may be deleted, while still retaining the administrator header and payload. If the device is recovered or the attacker otherwise defeated, the administrator header can be used to recover the volume key and generate a new user header, similar to the methods discussed above regarding user password resetting.

In one embodiment, a security agent on the computing device may be configured to periodically contact a server, authentication server, security server, or other entity, either at predetermined intervals, whenever the computing device finds a new network connection, or at other times. The security agent may comprise a service, daemon, application, routine, or other executable code for communicating with a server and deleting a user header of a virtual hard disk. In some embodiments, the server may be configured to deliver a "kill pill", token, or other message indicating that the security agent should delete the user header. For example, if a consultant's contract expires or a user is terminated from the corporation, or the user notifies the organization that their computing device has been stolen or otherwise compromised, an administrator may configure the server to deliver the kill pill to the computing device to delete the user header (e.g., without deleting the administrator header) and prevent the user from accessing the virtual hard disk.

In another example, the security agent may also act as a "dead man's switch" in case the computing device is offline for an extended period. The security agent may execute a timer function. If the timer, representing a "lease period" or how long the user can use the encrypted virtual hard disk without needing to communicate with a security server, expires, the security agent may delete the user header. This may be done to prevent an attacker from using a brute force attack on the user header while keeping the computing device offline, or otherwise force a user to periodically check in with the server (and incidentally retrieve any kill pill that is waiting to be delivered).

As discussed above, if the user header is deleted, either via a kill pill or expiration of the timer, the virtual hard disk is not destroyed. If the user is still privileged or part of the organization, the user may log in or otherwise authenticate to the server and retrieve the cryptographic secrets to generate the protection key to decrypt the administrator header and retrieve the volume key. The user or encryption engine may then generate a new user header with the decrypted volume key and access the protected data in the virtual hard disk. In one example, the user or encryption engine may determine that a user header has been deleted for various reasons. In such a case, the user or encryption engine (e.g., user device or server) may automatically generate the new user header upon a next login/authentication of the user associated with the virtual hard disk to the server in response to determining that the user header has been deleted. In some examples, the server may require that the condition under which the user header was deleted match with various pre-defined or specific qualifying conditions (e.g., not logging in for a threshold amount of time, too many failed attempts, etc.) to re-generate the user header. Otherwise (e.g., the specified conditions are not met), a user may be required to perform various actions, other than logging into the server, to have the user header re-generated and access restored, such as bringing the computing device into an organization or service location. Accordingly, the methods and systems discussed herein provide additional security without destruction of corporate information.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method comprising:
   determining, by a computing device, a first encryption secret and a second encryption secret;
   generating, by the computing device, an encryption key based on an encryption algorithm using the first encryption secret and the second encryption secret;
   encrypting, by the computing device, a header of a data storage using the encryption key, wherein the encrypted header of the data storage stores a volume key used to encrypt at least a payload of the data storage, wherein the volume key is different from the encryption key;
   deleting, by the computing device, the encryption key after encrypting the header; and
   storing, by the computing device, the first encryption secret to a first storage location and the second encryption secret to a second storage location, wherein the first storage location and the second storage location correspond to different network locations.

2. The method of claim 1, wherein the encryption key is deleted without allowing any transmission of the encryption key.

3. The method of claim 1, wherein generating the encryption key based on the encryption algorithm further uses a volume identifier of the data storage.

4. The method of claim 1, further comprising:
   encrypting a second header of the data storage, different from the header encrypted using the encryption key, using a key different from the encryption key, wherein the second header stores the volume key.

5. The method of claim 4, further comprising:
   determining that the second header has been deleted;
   in response to determining that the second header has been deleted, determining whether a user associated with the data storage has been authenticated; and
   in response to determining that the user associated with the data storage has been authenticated, re-generating the second header.

6. The method of claim 4, further comprising:
   determining that at least one predefined condition has been satisfied; and
   in response to determining that the at least one predefined condition has been satisfied, transmitting a command to delete the user header without deleting the header encrypted using the encryption key.

7. The method of claim 6, wherein the at least one predefined condition includes expiration of a time period.

8. The method of claim 6, wherein the at least one predefined condition includes a number of failed authentication attempts.

9. A method comprising:
   receiving, by a computing device, a request to decrypt at least a payload of a data storage encrypted using a first key;
   retrieving, by the computing device, a first encryption secret from a first network location and a second encryption secret from a second network location;
   generating, by the computing device, a second key using the first and second encryption secrets, the second key being different from the first key;
   decrypting, by the computing device, a header of the data storage using the second key, wherein the header of the data storage stores the first key;
   retrieving, by the computing device, the first key from the decrypted header; and
   decrypting, by the computing device, the at least a payload of the data storage.

10. The method of claim 9, wherein the second key is further generated using at least one of: a volume identifier of the data storage and a user identifier of a user associated with the data storage.

11. The method of claim 9, further comprising deleting the generated second key after decrypting the header of the data storage and without any transmission of the generated second key.

12. The method of claim 9, wherein the first network location is a user storage location and the second network location is an administrator storage location.

13. The method of claim 9, wherein the data storage is a virtual hard disk mountable to a user's computing device.

14. The method of claim 9, wherein generating the second key is further performed using a cryptographic sale stored in a clear text header of the data storage.

15. A non-transitory computer readable medium storing computer readable instructions that, when executed, cause the apparatus to:
   determine a first encryption secret and a second encryption secret;
   generate an encryption key based on an encryption algorithm using the first encryption secret and the second encryption secret;
   encrypt a header of a data storage using the encryption key, wherein the encrypted header of the data storage stores a volume key used to encrypt at least a payload of the data storage, and wherein the volume key is different from the encryption key;
   delete the encryption key after encrypting the header; and
   store the first encryption secret to a first storage location and the second encryption secret to a second storage location, wherein the first storage location and the second storage location correspond to different network locations.

16. The non-transitory computer readable medium of claim 15, wherein the encryption key is deleted prior to any transmission of the encryption key.

17. The non-transitory computer readable medium of claim 15, wherein generating the encryption key based on the encryption algorithm further uses a volume identifier of the data storage.

18. The non-transitory computer readable medium of claim 15, further comprising instructions for:
   encrypting a second header of the data storage, different from the header encrypted using the encryption key, using a key different from the encryption key, wherein the second header also stores the volume key.

19. The non-transitory computer readable medium of claim 18, further comprising instructions for:
   determining that the second header has been deleted;
   in response to determining that the second header has been deleted, determining whether a user associated with the data storage has been authenticated; and
   in response to determining that the user associated with the data storage has been authenticated, re-generating the second header.

20. The non-transitory computer readable medium of claim 19, wherein the data storage is a virtual storage disk mounted to a computing device of the user and wherein the second header is re-generated to the user's computing device.

* * * * *